(12) United States Patent
Maeda

(10) Patent No.: US 9,164,495 B2
(45) Date of Patent: Oct. 20, 2015

(54) MOTOR CONTROLLER CONTROLLING TWO MOTORS FOR DRIVING SINGLE DRIVEN OBJECT

(71) Applicant: FANUC Corporation, Yamanashi (JP)

(72) Inventor: Kazuomi Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/333,606

(22) Filed: Jul. 17, 2014

(65) Prior Publication Data
US 2015/0022137 A1    Jan. 22, 2015

(30) Foreign Application Priority Data

Jul. 19, 2013    (JP) ................................. 2013-150939

(51) Int. Cl.
| G05D 23/275 | (2006.01) |
|---|---|
| G05B 11/32 | (2006.01) |
| G05B 6/02 | (2006.01) |
| G05B 13/02 | (2006.01) |

(52) U.S. Cl.
CPC ................ *G05B 6/02* (2013.01); *G05B 13/021* (2013.01)

(58) Field of Classification Search
CPC ........... G05B 6/02; G05B 2219/41264; G05B 2219/42063; G05B 13/021; G05B 19/19; G05B 19/182
USPC ................................................. 318/632, 625
See application file for complete search history.

(56) References Cited

U.S. PATENT DOCUMENTS

| 5,646,495 A | * | 7/1997 | Toyozawa et al. ............. 318/625 |
| 6,046,566 A | * | 4/2000 | Sonoda et al. ................ 318/625 |

FOREIGN PATENT DOCUMENTS

| JP | 8-16246 A | 1/1996 |
|---|---|---|
| JP | 8-174481 A | 7/1996 |
| JP | 2001-273037 A | 10/2001 |
| JP | 2001-300792 A | 10/2001 |
| JP | 2003-79180 A | 3/2003 |
| JP | 2003-189657 A | 7/2003 |
| JP | 2005-278362 A | 10/2005 |
| JP | 2007-116836 A | 5/2007 |
| JP | 2009-177881 A | 8/2009 |
| JP | 2010-172054 A | 8/2010 |
| JP | 2012-165610 A | 8/2012 |
| JP | 2013-31234 A | 2/2013 |
| WO | 2004/092859 A1 | 10/2004 |

\* cited by examiner

*Primary Examiner* — Bentsu Ro
*Assistant Examiner* — Zemenay Truneh
(74) *Attorney, Agent, or Firm* — Hauptman Ham, LLP

(57) ABSTRACT

In a motor controller according to the present invention, a speed control unit $24m$ includes an integrator calculating an integrated value Sm of a speed error $\omega m-\omega m'$ between a speed command value $\omega m$ and a rotation speed $\omega m'$ and generates a torque command value Tm based on $\omega m-\omega m'$, a predetermined value, a proportional gain and an integration gain. A speed control unit $24s$ includes an integrator calculating an integrated value Ss of a speed error $\omega s-\omega s'$ between a speed command value $\omega s$ and a rotation speed $\omega s'$ and generates a torque command value Ts based on $\omega s-\omega s'$, the predetermined value, a proportional gain and an integration gain. An integrated value selecting unit 28 selects any one of Sm and Ss as the predetermined value, depending on a drive status of a main motor $6m$ and a sub motor $6s$.

3 Claims, 5 Drawing Sheets

MOTOR CONTROLLER CONTROLLING TWO MOTORS FOR DRIVING SINGLE DRIVEN OBJECT

CROSS-REFERENCE TO RELATED APPLICATIONS

This application is a new U.S. patent application that claims benefit of JP 2013-150939, filed on Jul. 19, 2013, the entire content of JP 2013-150939 is hereby incorporated by reference.

FIELD OF THE INVENTION

The present invention relates to a motor controller controlling two motors for driving a single driven object.

BACKGROUND OF THE INVENTION

Some motor-driven objects in machine tools and the like can be so large that the driven objects cannot be accelerated and decelerated by one motor alone. Furthermore, large backlash between mechanical elements of a transmission mechanism connected to a motor drive shaft and a driven object may prevent the driven object from being stably moved. In that case, tandem control is employed in which a single driven object is driven by two motors (For example, Japanese Unexamined Patent Publications No. JP-A-8-174481, JP-A-2003-79180, JP WO2004/92859, JP-A-2009-177881).

In such tandem control, one of two motors functions as a main motor having a drive shaft that acts as a master shaft coupled to a transmission mechanism. The other motor functions as a sub motor having a drive shaft that acts as a slave shaft coupled to a transmission mechanism.

To perform tandem control, backlash between mechanical elements of the transmission mechanism connected to the drive shaft of the motor and the driven object needs to be minimized. Therefore, a motor controller has been proposed that generates a preload torque value, which is a torque value added to a torque command value beforehand such that a force applied to the drive shaft of the main motor and a force applied to the drive shaft of the sub motor are in opposite directions (For example, Japanese Unexamined Patent Publications No. JP-A-8-16246, JP-A-2001-273037).

Further, adverse effects caused by a difference between the timing of detecting the speed of the main motor and the timing of detecting the speed of the sub motor on control of the motors and the like and overheat of the motors caused by such differences in tandem control need to be avoided. Therefore, a motor controller has been proposed that uses an integrated value of speed error between a speed command value for the main motor and the speed of the main motor to generate a torque command value for the main motor and a torque command value for the sub motor (For example, Japanese Unexamined Patent Publication No. JP-A-2003-189657).

Another motor controller has been proposed that generates a preload torque value and uses an integrated value of speed error between a speed command value for the main motor and the speed of the main motor to generate a torque command value for the main motor and a torque command value for the sub motor (For example, Japanese Unexamined Patent Publication No. JP-A-2010-172054).

The integrated value of speed error between a speed command value for a main motor and the speed of the main motor may be used to generate a torque command value for the main motor and a torque command value for a sub motor. In that case, there is a problem that when the sub motor is being mainly driven, in other words, when the acceleration of the main motor is negative, a position error between a position command value for the sub motor and the position of the sub motor can increase to the extent of adversely affecting the control of the motors.

An object of the present invention is to provide a motor controller capable of avoiding adverse effects of an increased position error on the control of two driven motors when any one of the two motors is mainly driven.

SUMMARY OF THE INVENTION

A motor controller according to one embodiment of the present invention is a motor controller controlling a first motor and a second motor in order to drive a single driven object. The motor controller includes a first position control unit generating a first speed command value on the basis of a position command value for the first motor, position information relating to the first motor and a first position control gain in order to control a position of the first motor, a second position control unit generating a second speed command value on the basis of a position command value for the second motor, position information relating to the second motor and a second position control gain in order to control a position of the second motor, a first speed control unit including a first integrator calculating an integrated value of a first speed error, the first speed error being a speed error between the first speed command value and a speed of the first motor, the first speed control unit generating a first torque command value on the basis of the first speed error, a predetermined value, a first proportional gain and a first integration gain in order to control the speed of the first motor, a second speed control unit including a second integrator calculating an integrated value of a second speed error, the second speed error being a speed error between the second speed command value and a speed of the second motor, the second speed control unit generating a second torque command value on the basis of the second speed error, the predetermined value, a second proportional gain and a second integration gain in order to control the speed of the second motor, an integrated value selecting unit selecting any one of the integrated value of the first speed error and the integrated value of the second speed error as the predetermined value, depending on drive status of the first motor and drive status of the second motor, a first motor driving unit driving the first motor on the basis of the first torque command value, and a second motor driving unit driving the second motor on the basis of the second torque command value.

Preferably, the integrated value selecting unit selects the integrated value of the first speed error as the predetermined value when an acceleration of the first motor exceeds a first value which is greater than zero, and selects the integrated value of the second speed error as the predetermined value when the acceleration of the first motor decreases below a second value which is smaller than zero.

Preferably, a motor controller according to another embodiment of the present invention further includes a preload torque value generating unit generating a first preload torque value and a second preload torque value such that a force applied to a drive shaft of the first motor and a force applied to a drive shaft of the second motor are in opposite directions, the first preload torque value being a torque value to be added to the first torque command value beforehand, the second preload torque value being a torque value to be added to the second torque command value beforehand.

The present invention is capable of providing a motor controller that avoids an adverse effect of an increased position error on the control of two driven motors when any one of the two motors is mainly driven.

DETAILED DESCRIPTION OF THE PREFERRED EMBODIMENT

Figure 1:
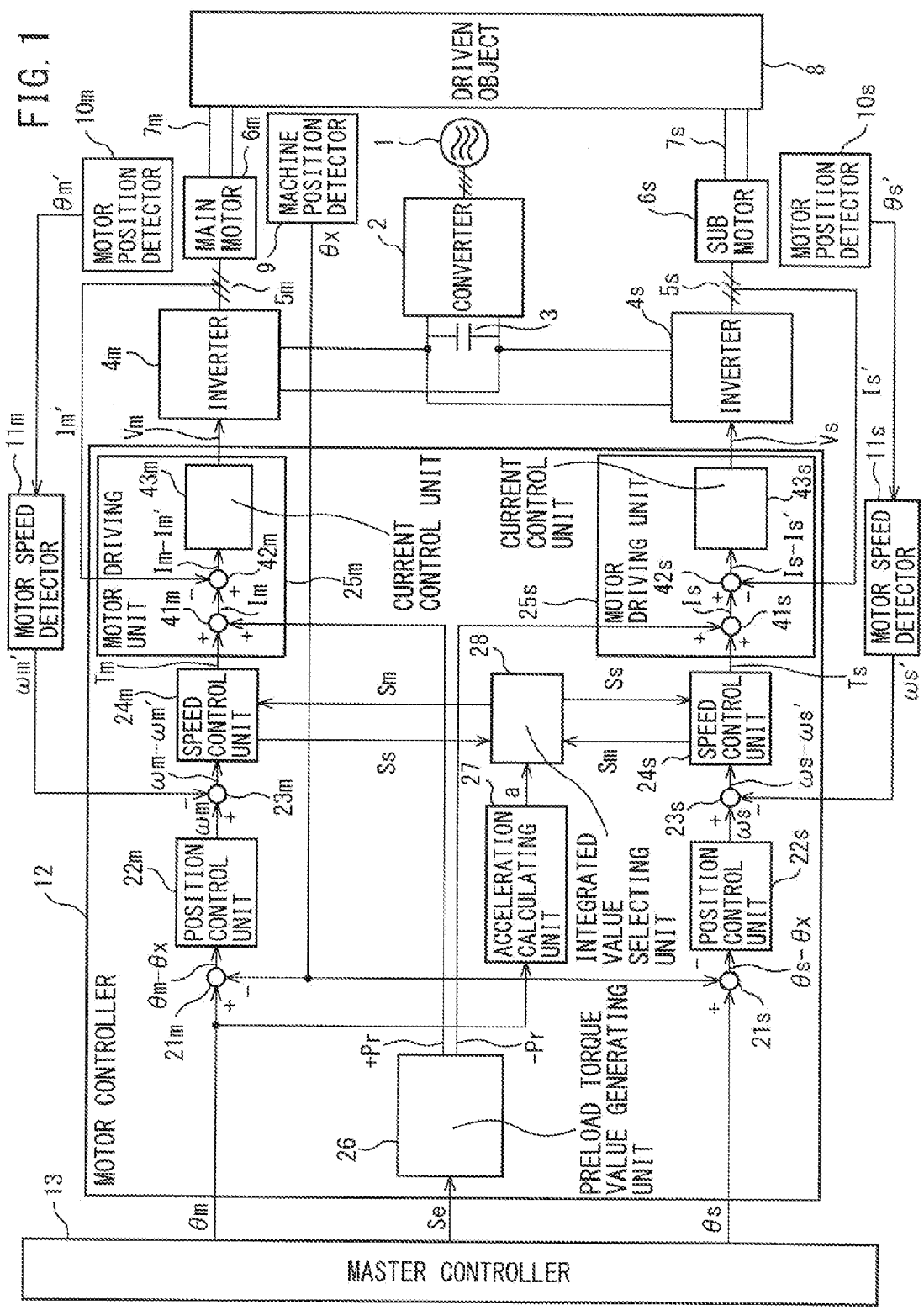
FIG. 1 is a block diagram of a system including a motor controller according to an embodiment of the present invention.

Embodiments of a motor controller according to the present invention will be described in detail with reference to drawings. Like elements are given like reference numerals throughout the drawings.

FIG. 1 is a block diagram of a system including a motor controller according to an embodiment of the present invention. The system illustrated in FIG. 1 includes a three-phase alternating-current (AC) source 1, a converter 2, a smoothing capacitor 3, inverters 4m, 4s, current detectors 5m, 5s, a main motor 6m which is a first motor, a sub motor 6s which is a second motor, transmission mechanisms 7m, 7s, a driven object 8, a machine position detector 9, motor position detectors 10m, 10s, motor speed detectors 11m, 11s, a motor controller 12 and a master controller 13.

The three-phase AC source 1 may be a commercial AC source. The converter 2 includes, for example, a plurality of rectifying diodes (six rectifying diodes in the case of three-phase AC) and transistors connected in antiparallel with the rectifying diodes, and converts AC power supplied from the three-phase AC source 1 to DC power.

The smoothing capacitor 3 is connected in parallel with the converter 2 so as to smooth a voltage rectified by the rectifying diodes of the converter 2. The inverters 4m, 4s are connected to the smoothing capacitor 3 in parallel and include, for example, a plurality of rectifying diodes (six rectifying diodes in the case of three-phase AC) and transistors connected to the rectifying diodes in antiparallel. The inverters 4m and 4s turn on and off the transistors in accordance with later-described PWM signals Vm and Vs, respectively, to convert DC power resulting from conversion by the converter 2 to AC power.

The current detector 5m is provided on the output line of the inverter 4m so as to detect a value of current Im' flowing into the main motor 6m. The current detector 5s is provided on the output line of the inverter 4s so as to detect a value of current Is' flowing into the sub motor 6s. In the present embodiments, the current detectors 5m, 5s are implemented by hole elements, for example.

The main motor 6m includes a drive shaft acting as a master shaft coupled to the transmission mechanism 7m and is driven by electric power accumulated in the smoothing capacitor 3. The sub motor 6s includes a drive shaft acting as a slave shaft coupled to the transmission mechanism 7s and is driven by electric power accumulated in the smoothing capacitor 3.

In this embodiment, each of the main motor 6m and the sub motor 6s is implemented by a rotary servomotor having permanent magnets provided on one of a rotor and a stator, a linear servomotor having permanent magnets provided on one of a stator and a slider, a vibration servomotor having permanent magnets provided on one of a stator and a vibrator, an induction motor without using permanent magnets, or the like.

The transmission mechanisms 7m, 7s are connected to the driven object 8 so as to move the driven object 8 along the direction of the axis of the transmission mechanisms 7m, 7s. The driven object 8 is implemented by a machine tool table, arms of an industrial robot, or the like.

The machine position detector 9 is implemented by a scale or the like for detecting the position θx of a machine, not depicted, including the transmission mechanisms 7m 7s, as position information relating to the first motor and position information relating to the second motor.

The motor position detector 10m is implemented by a rotary encoder, a hole element, a resolver or the like that detects a rotation angle θm' of the main motor 6m. The motor position detector 10s is implemented by a rotary encoder, a hole element, a resolver or the like that detects a rotation angle θs' of the sub motor 6s.

The motor speed detector 11m takes an input of the rotation angle θm' of the main motor 6m from the motor position detector 10m. The motor speed detector 11m calculates a rotation speed ωm' of the main motor 6m as a speed of the first motor through first-order differentiation of the rotation angle θm' with respect to time and outputs the rotation speed ωm' to the motor controller 12.

The motor speed detector 11s takes an input of the rotation angle θs' of the sub motor 6s from the motor position detector 10s. The motor speed detector 11s calculates a rotation speed ωs' of the sub motor 6s as a speed of the second motor through first-order differentiation of the rotation angle θs' with respect to time and outputs the rotation speed ωs' to the motor controller 12.

The motor controller 12 performs tandem control in which the driven object 8 is driven by the main motor 6m and the sub motor 6s, in order to reduce backlash between mechanical elements of the transmission mechanisms 7m, 7s and the driven object 8 and also to minimize a torsion of the drive shaft of the main motor 6m and a torsion of the drive shaft of the sub motor 6s. For that purpose, the motor controller 12 includes a subtracter 21m, a subtracter 21s, a position control unit 22m which is a first position control unit, a position control unit 22s which is a second position control unit, a subtracter 23m, a subtracter 23s, a speed control unit 24m which is a first speed control unit, a speed control unit 24s which is a second speed control unit, a motor driving unit 25m which is a first motor driving unit, a motor driving unit 25s which is a second motor driving unit, a preload torque value generating unit 26, an acceleration calculating unit 27, and an integrated value selecting unit 28.

The subtracter 21m includes a positive input terminal which receives a position command value θm as a position command value for the main motor 6m, which is the first motor, from the master controller 13, a negative input terminal which receives a position θx from the machine position detector 9, and an output terminal which outputs a position error θm-θx between the position command value θm and the position θx to the position control unit 22*m*.

The subtracter 21*s* includes a positive input terminal which receives a position command value θs as a position command value for the sub motor 6*s* which is the second motor, from the master controller 13, a negative input terminal which receives a position θx from the machine position detector 9, and an output terminal which outputs a position error θs-θx between the position command value θs and the position θx to the position control unit 22*s*.

The position control unit 22*m* generates a speed command value ωm for the main motor 6*m* as a first speed command value on the basis of the position command value θm, the position θx, and a position control gain Kd, which is a first position control gain, in order to control the position of the main motor 6*m*. For that purpose, the position control unit 22*m* includes an amplifier (not depicted) for the position control gain Kd, which receives a position error θm-θx from the subtracter 21*m* and amplifies the position error θm-θx. The position control unit 22*m* generates the speed command value ωm, which is the product of the position error θm-θx and the position control gain Kd, and outputs the generated speed command value ωm to the subtracter 23*m*.

The position control unit 22*s* generates a speed command value ωs for the sub motor 6*s* as a second speed command value on the basis of the position command value θs, the position θx, and a position control gain Kd', which is a second position control gain, in order to control the position of the sub motor 6*s*. For that purpose, the position control unit 22*s* includes an amplifier (not depicted) for the position control gain Kd' which receives a position error θs-θx from the subtracter 21*s* and amplifies the position error θs-θx. The position control unit 22*s* generates the speed command value ωs, which is the product of the position error θs-θx and the position control gain Kd' and outputs the generated speed command value ωs to the subtracter 23*s*. The position control gain Kd and the position control gain Kd' may be equal to each other.

The subtracter 23*m* includes a positive input terminal which receives the speed command value ωm from the position control unit 22*m*, a negative input terminal which receives the rotation speed ωm' from the motor speed detector 11*m*, and an output terminal which outputs a speed error ωm-ωm' as a first speed error which is a speed error between the speed command value ωm and the rotation speed ωm' to the speed control unit 24*m*.

The subtracter 23*s* includes a positive input terminal which receives the speed command value ωs from the position control unit 22*s*, a negative input terminal which receives a rotation speed ωs' from the motor speed detector 11*s*, and an output terminal which outputs a speed error ωs-ωs' as a second speed error which is a speed error between the speed command value ωs and the rotation speed ωs' to the speed control unit 24*s*.

The speed control unit 24*m* generates a torque command value Tm as a first torque command value on the basis of the speed error ωm-ωm', a predetermined value which will be described later, a proportional gain Kp which is a first proportional gain, and an integration gain Ki which is a first integration gain, in order to control the speed of the main motor 6*m*.

For that purpose, the speed control unit 24*m* includes a first integrator, described later, into which the speed error ωm-ωm' is input from the subtracter 23*m* for calculating the integrated value Sm of the speed error ωm-ωm', an amplifier, described later, for a proportional gain Kp for amplifying the speed error (ωm-ωm', and an amplifier, described later, for an integration gain Ki which amplifies the predetermined value mentioned above.

The speed control unit 24*m* generates a torque command value Tm which is the sum of the product of the speed error ωm-ωm' and the proportional gain Kp and the product of the predetermined value mentioned above and the integration gain Ki, and outputs the generated torque command value Tm to the motor driving unit 25*m*.

The speed control unit 24*s* generates a torque command value Ts as a second torque command value on the basis of a speed error ωs-ωs', the predetermined value mentioned above and the product of a proportional gain Kp' as a second proportional gain and an integration gain Ki' as a second integration gain, in order to control the speed of the sub motor 6*s*.

For that purpose, the speed control unit 24*s* includes a second integrator, described later, into which the speed error ωs-ωs' is input from the subtracter 23*s* for calculating the integrated value Ss of the speed error ωs-ωs', an amplifier, described later, for a proportional gain Kp' for amplifying the speed error ωs-ωs', and an amplifier, described later, for an integration gain Ki' which amplifies the predetermined value mentioned above.

The speed control unit 24*s* generates the torque command value Ts which is the sum of the product of the speed error ωs-ωs' and the proportional gain Kp' and the product of the predetermined value mentioned above and the integration gain Ki' and outputs the generated torque command value Ts to the motor driving unit 25*s*. The proportional gain Kp and the proportional gain Kp' may be equal to each other and the integration gain Ki and the integration gain Ki' may be equal to each other.

The motor driving unit 25*m* drives the main motor 6*m* on the basis of the torque command value Tm and a preload torque value +Pr, which will be described later. For that purpose, the motor driving unit 25*m* includes an adder 41*m*, a subtracter 42*m* and a current control unit 43*m*.

The adder 41*m* includes a first positive input terminal which receives the torque command value Tm from the speed control unit 24*m*, a second positive input terminal which receives the preload torque value +Pr from the preload torque value generating unit 26, and an output terminal which outputs a current command value Im for the main motor 6*m*, which corresponds to the sum of the torque command value Tm and the preload torque value +Pr.

The subtracter 42*m* includes a positive input terminal which receives the current command value Im from the adder 41*m*, a negative input terminal which receives a current value Im' from the current detector 5*m*, and an output terminal which outputs a current error Im-Im' between the current command value Im and the current value Im' to the current control unit 43*m*.

The current control unit 43*m* receives the current error Im-Im' from the subtracter 42*m* and generates a PWM signal Vm corresponding to a voltage command value for the main motor 6*m* on the basis of the input current error Im-Im'. The current control unit 43*m* outputs the generated PWM signal Vm to the inverter 4*m*.

The motor driving unit 25*s* drives the sub motor 6*s* on the basis of a torque command value Ts and a preload torque value −Pr, which will be described later. For that purpose, the motor driving unit 25*s* includes an adder 41*s*, a subtracter 42*s* and a current control unit 43*s*.

The adder 41*s* includes a first positive input terminal which receives the torque command value Ts from the speed control unit 24*s*, a second positive input terminal which receives the preload torque value −Pr from the preload torque value generating unit 26, and an output terminal which outputs a current command value Is for the sub motor 6s, which corresponds to the sum of the torque command value Ts and the preload torque value −Pr.

The subtracter 42s includes a positive input terminal which receives the current command value Is from the adder 41s, a negative input terminal which receives a current value Is' from the current detector 5s, and an output terminal which outputs a current error Is-Is' between the current command value Is and the current value Is' to the current control unit 43s.

The current control unit 43s receives the current error Is-Is' from the subtracter 42s and generates a PWM signal Vs corresponding to a voltage command value for the sub motor 6s on the basis of the input current error Is-Is'. The current control unit 43s outputs the generated PWM signal Vs to the inverter 4s.

The preload torque value generating unit 26 generates, in response to an excitation signal Se output from the master controller 13, the preload torque value +Pr as a first preload torque value to be added to the torque command value Tm beforehand and the preload torque value −Pr as a second preload torque value to be added to the torque command value Ts beforehand such that a force applied to the drive shaft of the main motor 6m and a force applied to the drive shaft of the sub motor 6s are in opposite directions. The preload torque value generating unit 26 outputs the generated preload torque values +Pr and −Pr to the adders 41m and 41s, respectively.

The acceleration calculating unit 27 receives the position command value θm from the master controller 13 and calculates an acceleration a as an acceleration for the first motor through second-order differentiation of the input position command value θm with respect to time. The acceleration calculating unit 27 outputs the calculated acceleration a to the integrated value selecting unit 28.

The integrated value selecting unit 28 selects one of the integrated values Sm and Ss as the predetermined value mentioned above, depending on the drive status of the main motor 6m and the drive status of the sub motor 6s.

Figure 2:
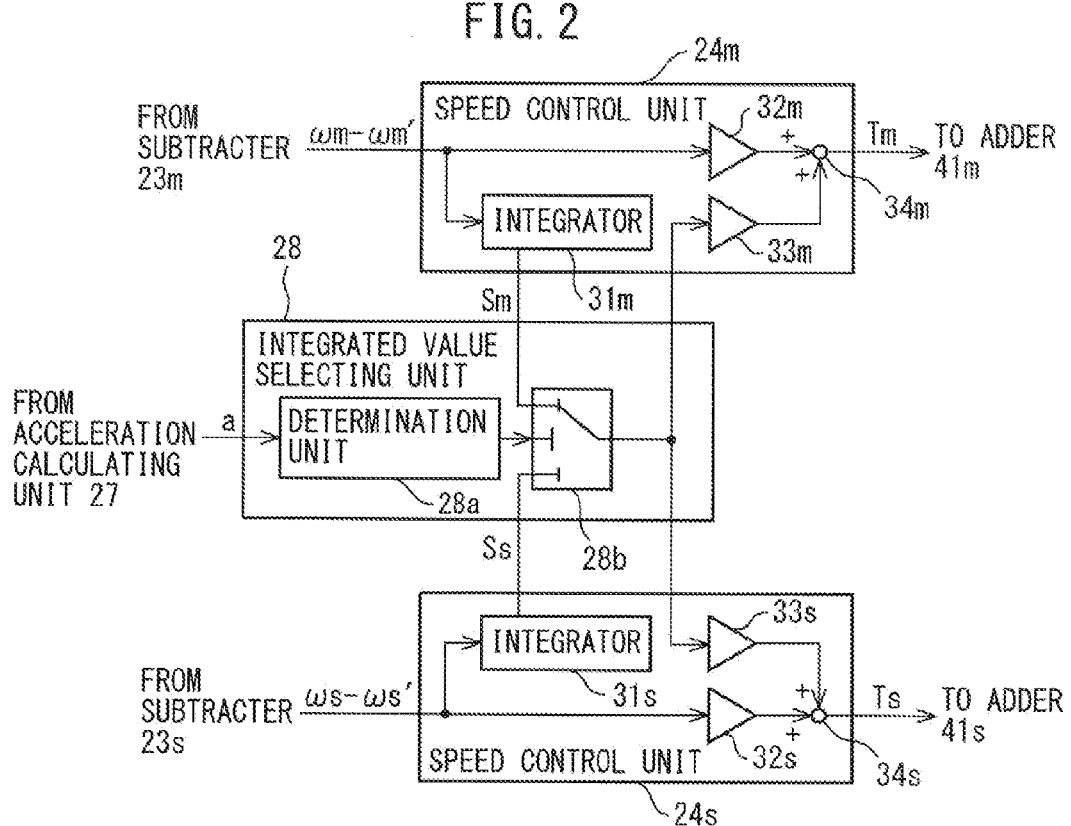
FIG. 2 is a diagram illustrating an example of an integrated value selecting unit and a speed control unit in FIG. 1 in detail.

FIG. 2 is a diagram illustrating an example of the integrated value selecting unit and the speed control unit in FIG. 1 in detail. As illustrated in FIG. 2, the speed control unit 24m includes an integrator 31m, which is the first integrator, an amplifier 32m, an amplifier 33m and an adder 34m.

The integrator 31m calculates an integrated value Sm. The amplifier 32m is an amplifier for the proportional gain Kp, which amplifies the speed error ωm-ωm'. The amplifier 33m is an amplifier for the integration gain Ki, which amplifies the predetermined value mentioned above.

The adder 34m includes a first input terminal which receives the product of the speed error ωm-ωm' and the proportional gain Kp from the amplifier 32m, a second input terminal which receives the product of the predetermined value mentioned above and the integration gain Ki from the amplifier 33m, and an output terminal which outputs a torque command value Tm which is the sum of these products.

As illustrated in FIG. 2, the speed control unit 24s includes an integrator 31s, which is the second integrator, an amplifier 32s, an amplifier 33s, and an adder 34s.

The integrator 31s calculates an integrated value Ss. The amplifier 32s is an amplifier for the proportional gain Kp', which amplifies the speed error ωs-ωs'. The amplifier 33s is an amplifier for the integration gain Ki', which amplifies the predetermined value mentioned above.

The adder 34s includes a first input terminal which receives the product of the speed error ωs-ωs' and the proportional gain Kp' from the amplifier 32s, a second input terminal which receives the product of the predetermined value mentioned above and the integration gain Ki' from the amplifier 33s, and an output terminal which outputs the torque command value Ts which is the sum of these products.

As illustrated in FIG. 2, the integrated value selecting unit 28 includes a determination unit 28a and a switch 28b. Acceleration a is input from the acceleration calculating unit 27 into the determination unit 28a. The determination unit 28a determines, on the basis of the acceleration a, whether the motor controller 12 is mainly driving the main motor 6m or mainly driving the sub motor 6s. The determination unit 28a provides a command that depends on the determination to the switch 28b. The switch 28b connects one of the output of the integrator 31m and the output of the integrator 31s to the input of the amplifier 33m and the input of the amplifier 33s in accordance with the command from the determination unit 28a.

More specifically, when the acceleration a is kept greater than a threshold value Th' which is a second value smaller than zero (Th'<0) after the motor controller 12 has been set to mainly drive the main motor 6m or after the acceleration a has exceeded a threshold value Th which is a first value greater than zero (Th>0), the determination unit 28a determines that the motor controller 12 is mainly driving the main motor 6m. On the other hand, when the acceleration a is kept smaller than the threshold value Th after the motor controller 12 has been set to mainly drive the sub motor 6s or after the acceleration a has decreased below the threshold value Th', the determination unit 28a determines that the motor controller 12 is mainly driving the sub motor 6s. The threshold value Th may be equal to the absolute value of the threshold value Th'. The use of the two threshold values Th and Th' can prevent chattering.

When the determination unit 28a determines that the motor controller 12 is mainly driving the main motor 6m, the determination unit 28a controls the switch 28b so as to connect the output of the integrator 31m to the input of the amplifier 33m and the input of the amplifier 33s. Accordingly, the integrated value selecting unit 28 selects the integrated value Sm as the predetermined value mentioned above, so that the speed control unit 24m outputs the torque command value Tm which is the sum of the product of the speed error ωm-ωm' and the proportional gain Kp and the product of the integrated value Sm and the integration gain Ki, and the speed control unit 24s outputs the torque command value Is which is the sum of the product of the speed error ωs-ωs' and the proportional gain Kp' and the product of the integrated value Sm and the integration gain Ki'.

On the other hand, when the determination unit 28a determines that the motor controller 12 is mainly driving the sub motor 6s, the determination unit 28a controls the switch 28b so as to connect the output of the integrator 31s to the input of the amplifier 33m and the input of the amplifier 33s. Accordingly, the integrated value selecting unit 28 selects the integrated value Ss as the predetermined value mentioned above, so that the speed control unit 24m outputs the torque command value Tm which is the sum of the product of the speed error ωm-ωm' and the proportional gain Kp and the product of the integrated value Ss and the integration gain Ki, and the speed control unit 24s outputs the torque command value Ts which is the sum of the product of the speed error ωs-ωs' and the proportional gain Kp' and the product of the integrated value Ss and the integration gain Ki'.

The master controller 13, which is implemented by a CNC (Computer Numerical Controller) or the like, outputs the position command value θm to the subtracter 21m and the acceleration calculating unit 27, outputs the position command value θs to the subtracter 21s and outputs the excitation signal Se for generating the preload torque values +Pr and −Pr to the preload torque value generating unit 26.

In this embodiment, the motor controller 12 is implemented by a processor including input/output ports, a serial communication circuit, an analog-digital converter, a comparator and other components, and performs various processes according to process programs stored in a memory, not depicted.

Figure 3:
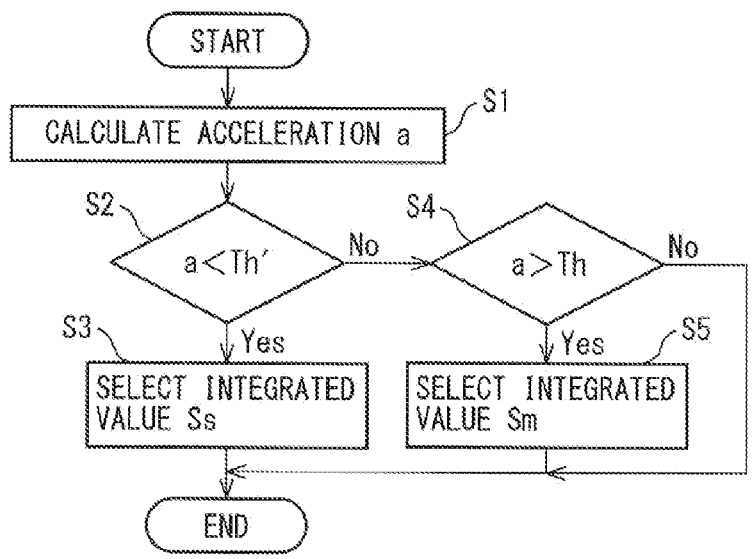
FIG. 3 is a flowchart of an operation of the motor controller illustrated in FIG. 1.

FIG. 3 is a flowchart of an operation of the motor controller illustrated in FIG. 1. First, the acceleration calculating unit 27 calculates the acceleration a and outputs the calculated acceleration a to the determination unit 28a (step S1). Then the determination unit 28a determines whether or not the calculated acceleration a is smaller than the threshold value Th' (step S2). When the acceleration a is smaller than the threshold value Th', the determination unit 28a controls the switch 28b so as to connect the output of the integrator 31s to the input of the amplifier 33m and the input of the amplifier 33s in order to select the integrated value Ss as the predetermined value mentioned above (step S3), then the process flow is terminated.

On the other hand, when the acceleration a is greater than or equal to the threshold value Th', the determination unit 28a determines whether or not the calculated acceleration a is greater than the threshold value Th (step S4). When the acceleration a is greater than the threshold value Th, the determination unit 28a controls the switch 28b so as to connect the output of the integrator 31m to the input of the amplifier 33m and the input of the amplifier 33s in order to select the integrated value Sm as the predetermined value mentioned above (step S5), then the process flow is terminated. On the other hand, when the acceleration a is smaller than or equal to the threshold value Th, the process flow is terminated.

Figure 4:
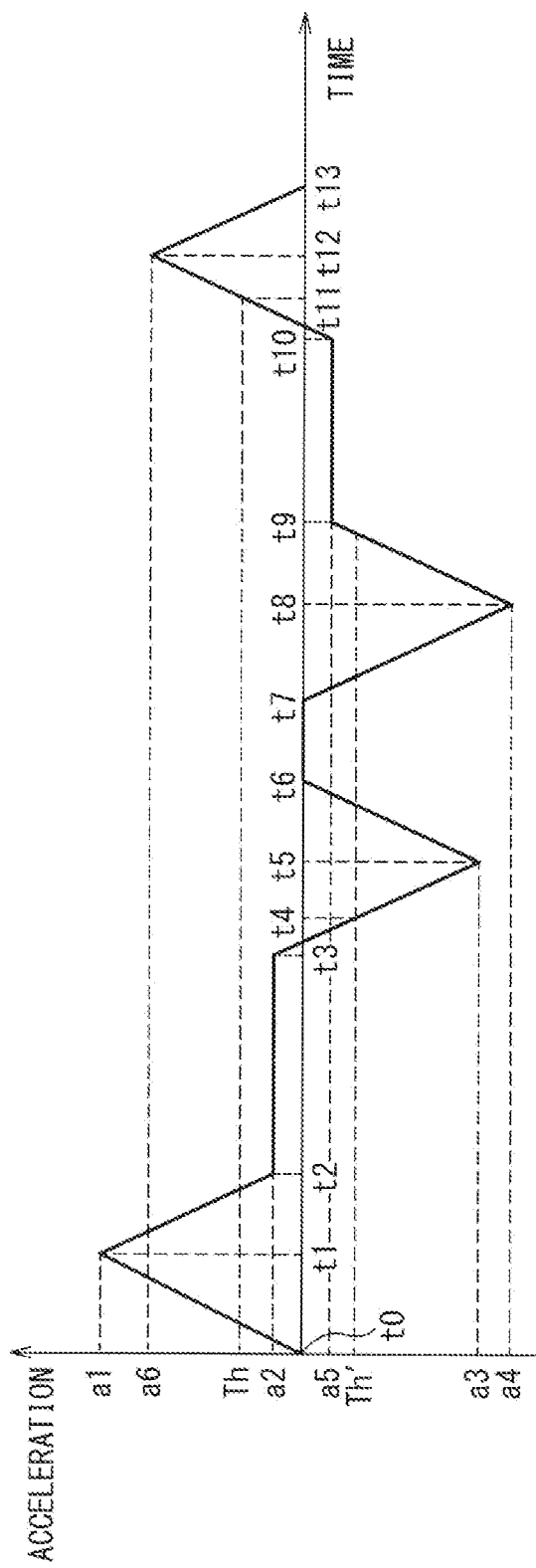
FIG. 4 is a diagram illustrating an example of variations with time in acceleration of a motor controlled by the motor controller illustrated in FIG. 1.

FIG. 4 is a diagram illustrating an example of variations with time in acceleration of the motor controlled by the motor controller illustrated in FIG. 1. In an operation described with reference to FIG. 4, the determination unit 28a selects, at time t0 which is the start of the operation, an integrated value Ss as the predetermined value mentioned above in order to set the motor controller 12 to mainly drive the main motor 6m.

In FIG. 4, the acceleration a linearly increases from zero to a1 (a1>Th) in the period from time t0 to time t1. In the period from time t1 to time t2, the acceleration a linearly decreases from a1 to a2 (a2<a1). In the period from time t2 to time t3, the acceleration a is maintained at a2 (the speed of the main motor 6m remains constant). In the period from time t3 to time t4, the acceleration a linearly decreases from a2 to the threshold value Th'. In other words, the acceleration a is kept greater than the threshold value Th' in the period from time t0 to time t4 after the motor controller 12 has been set to mainly drive the main motor 6m. Accordingly, the determination unit 28a determines that the motor controller 12 is mainly driving the main motor 6m in the period from time t0 to time t4, and selects the integrated value Ss as the predetermined value mentioned above.

In the period from time t4 to time t5 in FIG. 4, the acceleration a linearly decreases from the threshold value Th' to a3 (a3<Th'). In the period from time t5 to time t6, the acceleration a linearly increases from a3 to zero. In other words, the acceleration a is kept smaller than the threshold value Th in the period from time t4 to time t6 after the acceleration a has decreased below the threshold value Th'. Accordingly, the determination unit 28a determines that the motor controller 12 is mainly driving the sub motor 6s in the period from time t4 to time t6, and selects the integrated value Ss as the predetermined value mentioned above.

In the period from time t6 to time t7 in FIG. 4, the acceleration a is maintained at zero (the main motor 6m is at rest). In the period from time t7 to time t8, the acceleration a linearly decreases from zero to a4 (a4<a3). In the period from time t8 to time t9, the acceleration a linearly increases from a4 to a5 (Th'<a5<0). In the period from time t9 to time t10, the acceleration a is maintained at a5 (the speed of the main motor 6m remains constant). In the period from time t10 to time t11, the acceleration a linearly increases from a5 to the threshold value Th. In other words, the acceleration a is kept smaller than the threshold value Th in the period from time t6 to time t11 after the motor controller 12 has been set to mainly drive the sub motor 6s. Accordingly, the determination unit 28a determines that the motor controller 12 is mainly driving the sub motor 6s in the period from time t6 to time t11, and selects the integrated value Ss as the predetermined value mentioned above.

In the period from time t11 to time t12, the acceleration a linearly increases from the threshold value Th to a6 (Th<a6<a1). In the period from time t12 to time t13, the acceleration a linearly decreases from a1 to zero. In other words, the acceleration a is kept greater than the threshold value Th' in the period from time t11 to time t13 after the acceleration a has exceeded the threshold value Th. Accordingly, the determination unit 28a determines that the motor controller 12 is mainly driving the main motor 6m in the period from time t11 to time t13, and selects the integrated value Sm as the predetermined value mentioned above.

Figure 5A:
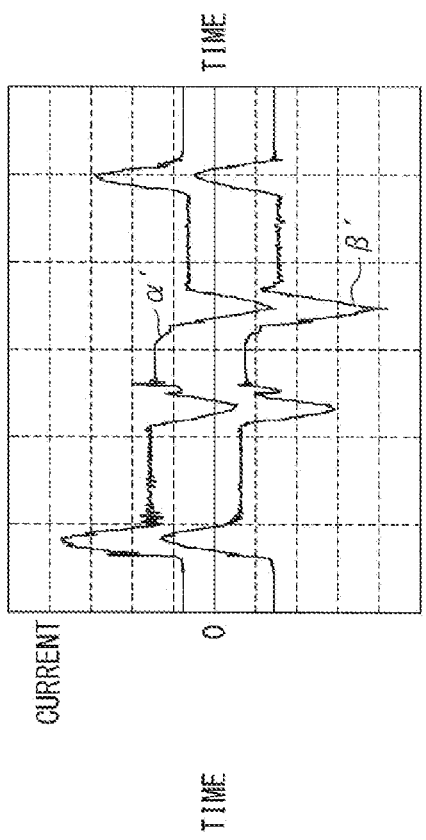
FIG. 5A is a diagram illustrating an advantageous effect of a motor controller according to the present invention.
Figure 5C:
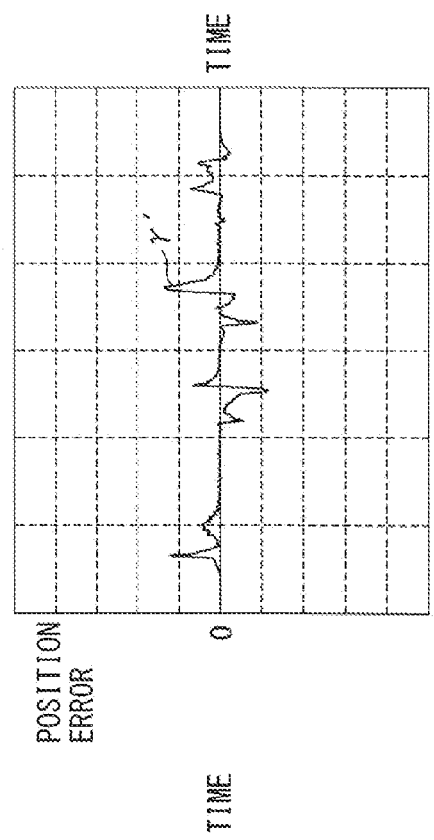
FIG. 5C is a diagram illustrating an advantageous effect of a motor controller according to the present invention.
Figure 5B:
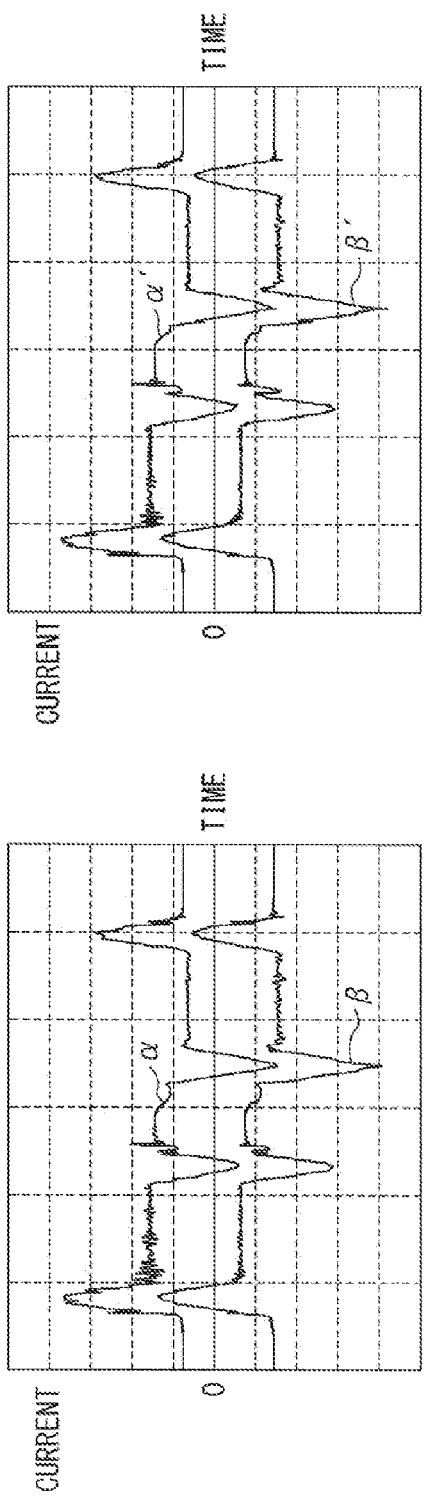
FIG. 5B is a diagram illustrating an advantageous effect of a motor controller according to the present invention.

FIGS. 5A to 5D are diagrams illustrating an advantageous effect of the motor controller according to the present invention. In FIG. 5A, solid curves α and β represent variations with time in current command values Im and Is, respectively, that occur when an integrated value Sm is selected regardless of which of the main motor 6m and the sub motor 6s is being mainly driven by the motor controller 12 under the condition where the preload torque values +Pr, −Pr are being generated. A solid curve γ in FIG. 5B represents a position error θs-θm' corresponding to the current command values Im and Is represented by the solid curves α and β, respectively.

Figure 5D:
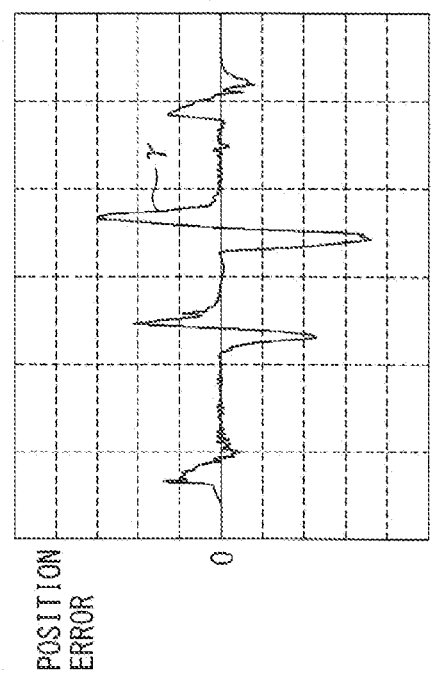
FIG. 5D is a diagram illustrating an advantageous effect of a motor controller according to the present invention.

In FIG. 5C, solid curves α' and β' represent variations with time in the current command values Im and Is, respectively, that occur when the integrated value Sm is selected while the motor controller 12 is mainly driving the main motor 6m and when the integrated value Ss is selected while the motor controller 12 is mainly driving the sub motor 6s, respectively, under the condition where the preload torque values +Pr, −Pr, are being generated. In FIG. 5D, a solid curve γ' represents a position error θs-θm' corresponding to the current command values Im and Is represented by solid curves α' and β', respectively.

As represented by solid curves γ and γ', variations in the position error θs-θx when the integrated value Sm is selected while the motor controller 12 is mainly driving the main motor 6m and when the integrated value Ss is selected while the motor controller 12 is mainly driving the sub motor 6s under the condition where the preload torque values +Pr, −Pr are being generated are much less than when the integrated value Sm is selected regardless of which of the main motor 6m and the sub motor 6s is being mainly driven by the motor controller 12 under the condition where the preload torque values +Pr, −Pr are being generated.

Thus, adverse effects of an increased position error θs-θx on the control of the main motor 6m and the sub motor 6s can be avoided by selecting the integrated value Sm while the motor controller 12 is mainly driving the main motor 6m and selecting integrated value Ss while the motor controller 12 is mainly driving the sub motor 6s, under the condition where the preload torque values +Pr, −Pr are being generated.

According to this embodiment, the integrated value selecting unit 28 selects one of the integrated value Sm and the integrated value Ss as the predetermined value mentioned above depending on the drive status of the main motor 6m and the drive status of the sub motor 6s. Specifically, the integrated value selecting unit 28 selects the integrated value Sm as the predetermined value mentioned above when the acceleration a exceeds the threshold value Th (the main motor 6m is mainly being driven) and selects the integrated value Ss as the predetermined value mentioned above when the acceleration a decreases below the threshold value Th' (the sub motor 6s is mainly being driven). By selecting one of the integrated value Sm and the integrated value Ss as the predetermined value mentioned above in this way, adverse effects of an increased position error θs-θx on the control of the main motor 6m and the sub motor 6s can be avoided regardless of which of the main motor 6m and the sub motor 6s is being mainly driven while the main motor 6m and the sub motor 6s are being driven.

Figure 6:
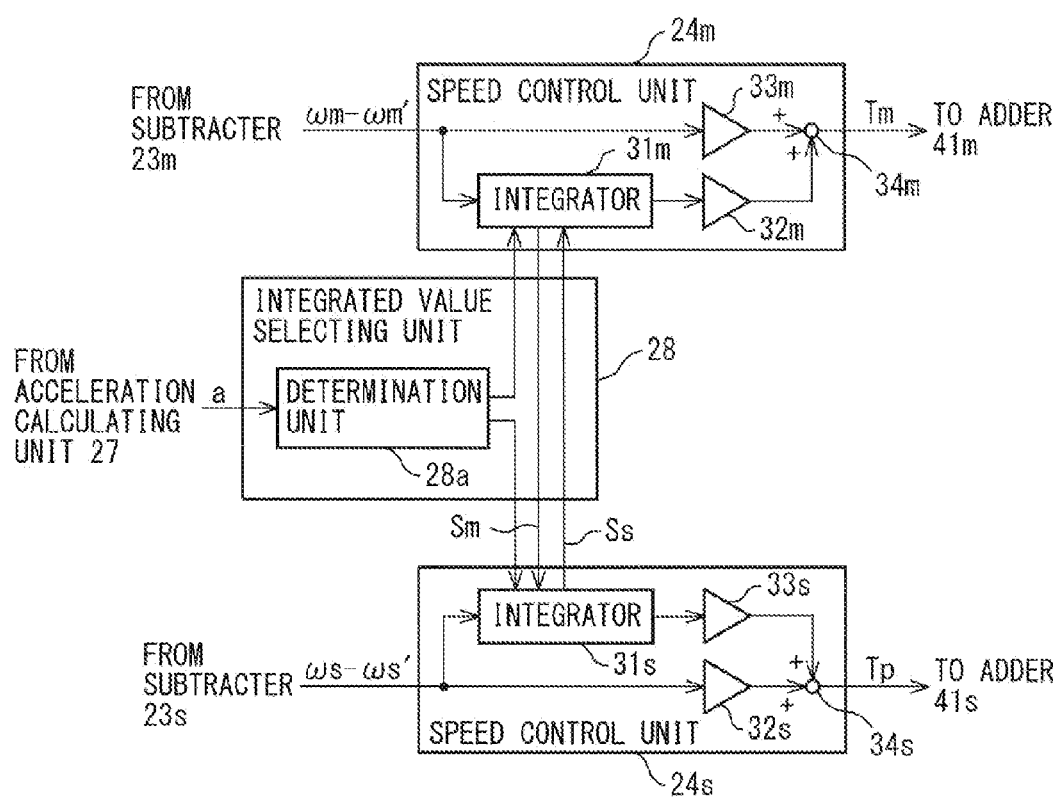
FIG. 6 is a diagram illustrating another example of the integrated value selecting unit and the speed control unit in FIG. 1 in detail.

FIG. 6 is a diagram illustrating another example of the integrated value selecting unit and speed control unit in FIG. 1 in detail. As illustrated in FIG. 6, the integrated value selecting unit 28 includes a determination unit 28a. The determination unit 28a receives the acceleration a from an acceleration calculating unit 27 and, based on the acceleration a, determines whether the motor controller 12 is mainly driving the main motor 6m or mainly driving the sub motor 6s.

When the determination unit 28a determines that the motor controller 12 is mainly driving the main motor 6m, the determination unit 28a replaces the integrated value Ss calculated by an integrator 31s with the integrated value Sm calculated by the integrator 31m. The integrator 31s outputs the integrated value Sm, instead of the integrated value Ss, to the amplifier 33s. Accordingly, the integrated value selecting unit 28 selects the integrated value Sm as the predetermined value mentioned above, so that the speed control unit 24m outputs the torque command value Tm which is the sum of the product of the speed error ωm-ωm' and the proportional gain Kp and the product of the integrated value Sm and an integration gain Ki, whereas the speed control unit 24s outputs a torque command value Ts which is the sum of the product of the speed error ωs-ωs' and the proportional gain Kp' and the product of the integrated value Sm and an integration gain Ki'.

On the other hand, when the determination unit 28a determines that the motor controller 12 is mainly driving the sub motor 6s, the determination unit 28a replaces the integrated value Sm calculated by the integrator 31m with the integrated value Ss calculated by the integrator 31s. The integrator 31m outputs the integrated value Ss, instead of the integrated value Sm, to the amplifier 33m. Accordingly, the integrated value selecting unit 28 selects the integrated value Ss as the predetermined value mentioned above, so that the speed control unit 24m outputs the torque command value Tm which is the sum of the product of the speed error ωm-ωm' and the proportional gain Kp and the product of the integrated value Ss and the integration gain Ki, whereas the speed control unit 24s outputs the torque command value Ts which is the sum of the product of the speed error ωs-ωs' and the proportional gain Kp' and the product of the integrated value Ss and the integration gain Ki'.

The present invention is not limited to the embodiments described above and various modifications and variations are possible. For example, while a position θx of a machine is used as position information relating to a first motor and position information relating to a second motor in the embodiments described above, a rotation angle θm' of a main motor 6m and a rotation angle θs' of a sub motor 6 may be used as the position information relating to the first motor and the position information relating to the second motor.

While a position θx of a machine is used to obtain a position error of the sub motor 6s in the embodiments described above, a rotation angle θs' of the sub motor 6s may be used to obtain the position error of the sub motor 6s.

While the above-described embodiments describe a case in which an acceleration a of the first motor is calculated by second-order differentiation of a position command value θm with respect to time, the acceleration a may be calculated by second-order differentiation of a rotation angle θm' with respect to time, or by second-order differentiation of a rotation angle θs' with respect to time, or by dividing the sum of the value calculated by second-order differentiation of the rotation angle θm' with respect to time and the value calculated by second-order differentiation of the rotation angle θs' with respect to time by 2.

While the embodiments have been described with examples where the preload torque value generating unit 26 is provided, the preload torque value generating unit 26 may be omitted.

What is claimed is:

1. A motor controller controlling a first motor and a second motor in order to drive a single driven object, the motor controller comprising:
   a first position control unit generating a first speed command value on the basis of a position command value for the first motor, position information relating to the first motor and a first position control gain in order to control a position of the first motor;
   a second position control unit generating a second speed command value on the basis of a position command value for the second motor, position information relating to the second motor and a second position control gain in order to control a position of the second motor;
   a first speed control unit including a first integrator calculating an integrated value of a first speed error, the first speed error being a speed error between the first speed command value and a speed of the first motor, the first speed control unit generating a first torque command value on the basis of the first speed error, a predetermined value, a first proportional gain and a first integration gain in order to control the speed of the first motor;
   a second speed control unit including a second integrator calculating an integrated value of a second speed error, the second speed error being a speed error between the second speed command value and a speed of the second motor, the second speed control unit generating a second torque command value on the basis of the second speed error, the predetermined value, a second proportional gain and a second integration gain in order to control the speed of the second motor;
   an integrated value selecting unit selecting any one of the integrated value of the first speed error and the integrated value of the second speed error as the predetermined value, depending on drive status of the first motor and drive status of the second motor;
   a first motor driving unit driving the first motor on the basis of the first torque command value; and
   a second motor driving unit driving the second motor on the basis of the second torque command value.

2. The motor controller according to claim 1,
   wherein the integrated value selecting unit selects the integrated value of the first speed error as the predetermined value when an acceleration of the first motor exceeds a first value which is greater than zero, and selects the integrated value of the second speed error as the predetermined value when the acceleration of the first motor decreases below a second value which is smaller than zero.

3. The motor controller according to claim 1, further comprising a preload torque value generating unit generating a first preload torque value and a second preload torque value such that a force applied to a drive shaft of the first motor and a force applied to a drive shaft of the second motor are in opposite directions, the first preload torque value being a torque value to be added to the first torque command value beforehand, the second preload torque value being a torque value to be added to the second torque command value beforehand.

* * * * *